April 11, 1933.   K. E. GATH   1,903,449
FLIGHT INDICATOR
Original Filed Dec. 14, 1929   3 Sheets-Sheet 1

Inventor
Kenneth E. Gath
By Clarence A. O'Brien
Attorney

April 11, 1933.  K. E. GATH  1,903,449
FLIGHT INDICATOR
Original Filed Dec. 14, 1929  3 Sheets-Sheet 2
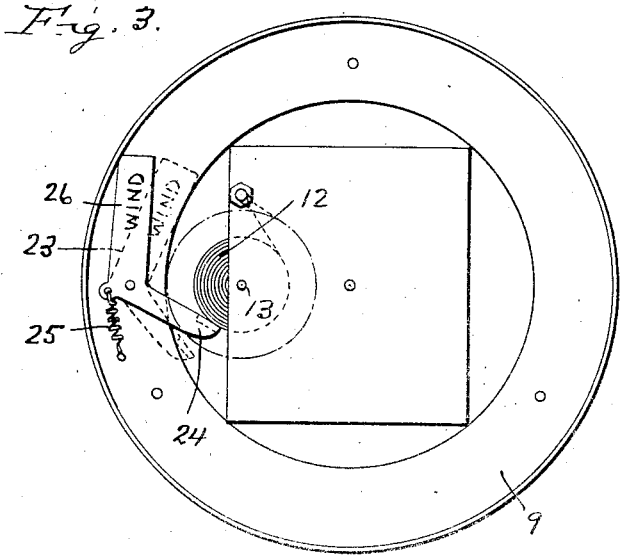
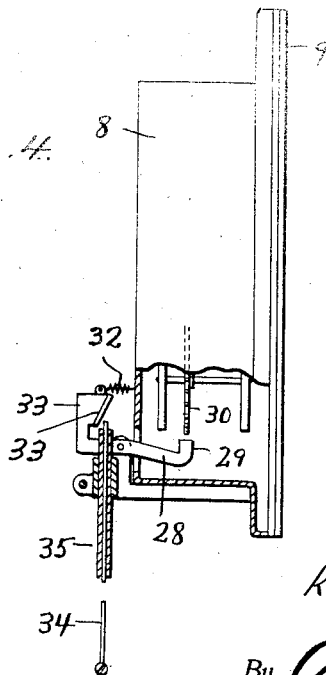
Inventor
Kenneth E. Gath
By Clarence A. O'Brien
Attorney April 11, 1933. K. E. GATH 1,903,449

FLIGHT INDICATOR

Original Filed Dec. 14, 1929  3 Sheets-Sheet 3

Inventor
Kenneth E. Gath

By *Clarence A. O'Brien*
Attorney

Patented Apr. 11, 1933

1,903,449

UNITED STATES PATENT OFFICE

KENNETH EARL GATH, OF HARRISBURG, PENNSYLVANIA

FLIGHT INDICATOR

Application filed December 14, 1929, Serial No. 414,112. Renewed September 20, 1932.

The present invention relates to indicating means for aeroplanes and the like and has for its particular object to register and indicate the time in which the aeroplane is in actual flight.

A further important object is to provide an instrument of this character employing the use of a clock mechanism for recording the hours and portions of hours during which the machine remains in flight and which is operatively connected with the landing gear of the machine to stop the mechanism when the machine reaches the ground.

A further object of the invention is to provide an apparatus of this character of a simple and practical construction, which is efficient and reliable in performance, relatively inexpensive to manufacture and install in operative position and otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 3 is a similar view with the cover plate removed,

Figure 5:
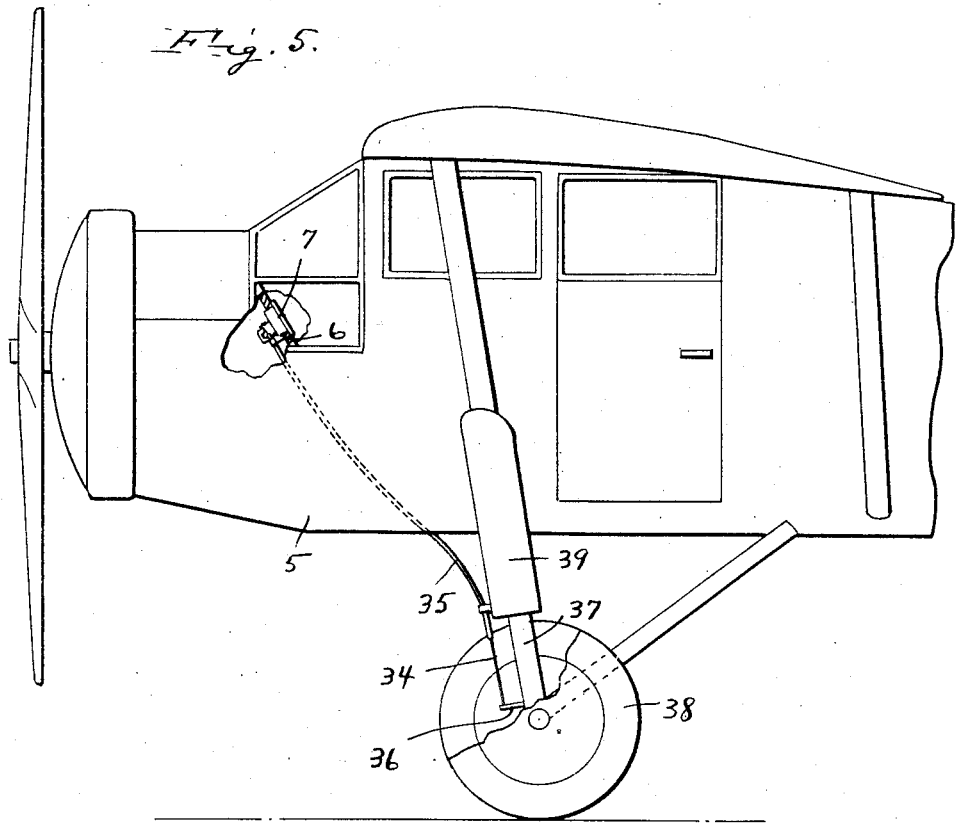
Figure 6:
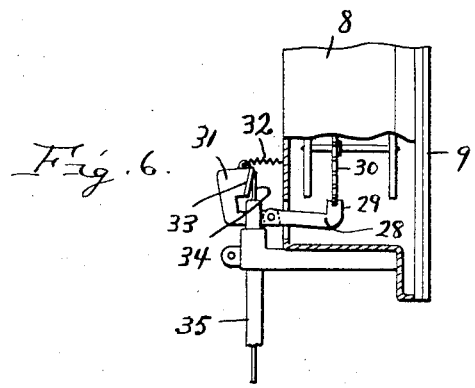

Figure 4 is a side elevational view with parts broken away and shown in section to illustrate the stop mechanism when in released position, Figure 5 is a fragmentary side elevational view of an aeroplane showing the manner of connecting the stop mechanism with the landing gear of the machine and Figure 6 is a fragmentary side elevational view of the instrument with the stop mechanism in position for interrupting the further movement of the mechanism of the instrument.

Referring now to the drawings in detail for the purpose of illustration I have shown the invention mounted in position for operation upon the conventional type of aeroplane indicated generally at 5 and which is provided with an instrument board 6 upon which the instrument 7 forming the subject matter of the present invention, is mounted.

The instrument comprises a casing 8 having a cover plate 9 secured to its face and at the forward side of which is placed a dial plate 10.

The operating means of the instrument comprises a train of gearing 11 operated by a spring 12 substantially similar to the main spring of a clock or watch.

Figure 1:
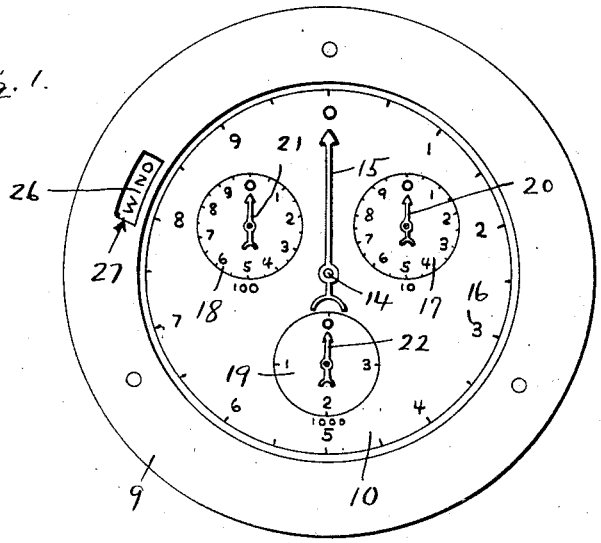
Figure 1 is a front elevational view of the instrument showing the dials provided for recording the elapsed time.
Figure 2:
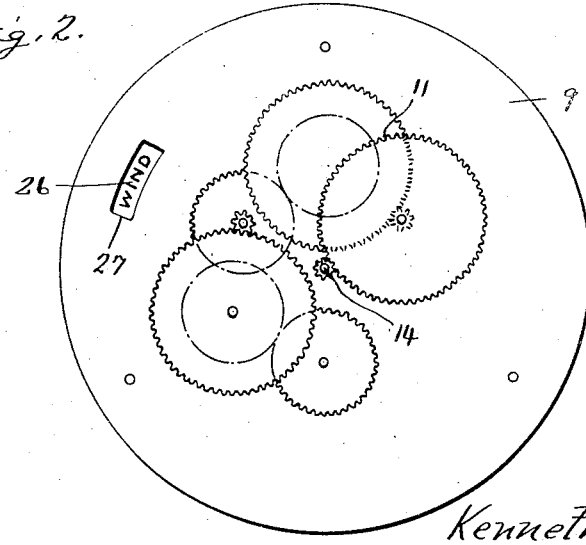
Figure 2 is a similar view with the dial stick removed.

The spring 12 is operatively connected with a shaft 13 for driving the shaft, said shaft having one of the gears mounted thereon and interconnected with the train of gears 11 for the operation thereof, as clearly illustrated in Figure 2 of the drawings.

A centrally disposed shaft 14 is journalled in the casing having one of the gears keyed thereto and this shaft also carries a pointer or hand 15 outwardly of the face of the dial 10 for cooperation with an hour scale 16 which is arranged around the border of the dial and which is graduated from one to ten, so that the movement of the hand around the dial will denote an elapsed time in hours, or portions thereof up to ten.

The face of the dial plate 10 is also provided with smaller dials 17, 18 and 19 having hands or pointers 20, 21 and 22 associated respectively therewith, the dial 17 also being graduated from one to ten with its hand operated by one of the gears having a gear ratio with respect to the gear of the shaft 14 to register each complete revolution of the hand 15 and thus indicate the lapse in hours in units of ten.

The dial 18 is also graduated from one to ten and has the hand 21 associated therewith operated by one of the gears having a gear ratio of one to ten with respect to the gear employed for operating the hand 20 so that the dial 18 accordingly will indicate an elapsed time in units of one hundred.

The dial 18 with its associated hand 22 is similarly operated through the train of gears having a gear ratio of ten to one with respect to the gear used for operating the hand 21 in order that the hands 22 of the dial 19 will indicate the elapsed time for each one thousand hours.

The spring 12 is adapted to be wound from time to time in the usual manner to maintain the proper attention thereon for operating the train of gears 11 and an indicating means for the spring is provided comprising a bell crank lever 23 pivotally mounted to the cover 9 and having one end 24 engageable with the outer convolution of the spring, it being apparent that when the spring is unwound or in an expanded condition the end of the arm 24 will be moved in accordance with the expanding movement of the spring.

The end of the arm 24 is maintained in constant engagement with the spring by means of a coil spring 25. The opposite end of the arm 23 is provided with indicia 26 for registering with an opening 27 formed in the cover and accordingly when the spring is unwound the indicia will be moved into registry with the opening to indicate to the pilot of the machine that the spring needs rewinding.

A stop mechanism is provided for the train of gears comprising a lever 28 pivotally mounted at the rear of the casing and having one end 29 bent angularly for positioning between the teeth of one of the gears shown at 30 whereby to prevent movement of the gears.

The opposite end of the lever 28 is also bent angularly as shown at 31 and is provided with a coil spring 32 attached to the casing for normally urging the lever out of gear engaging position.

The inner edge of the end 31 of the lever is provided with an inclined face 33 with which one end of a wire rod 34 is engageable for sliding movement along the inclined face whereby to move the lever into gear engaging position.

The wire rod 34 is slidably mounted in a housing 35 extending downwardly through the fuselage of the aeroplane and with the lower end of the wire engageable by a projection 36 carried by the telescoping upright 37 of the landing gear 38 of the machine.

The telescoping upright forms part of a shock absorbing mechanism for the landing gear and is slidably carried in a housing 39 within which the shock absorbing means is contained. Accordingly as the machine strikes the ground the upright 37 will be forced upwardly into the housing 39 which in turn will cause an upward movement of the rod 34 whereby to move the lever 28 into engaging position and thus stop the further operation of the time recording mechanism.

As long as the weight of the machine rests upon the landing gear, the rod will be retained in its upward position and when the plane again takes off in flight the telescoping upright is projected downwardly by the shock absorbing mechanism so as to release the rod and permit the spring 32 to remove the stop from the gear of the clock mechanism.

It will thus be apparent that the exact number of hours of flight of the aeroplane will be recorded on the instrument whereby it will be possible and also serve as a means for checking up on the time for making periodic repairs and overhauling the engine of the machine.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

In combination with an aeroplane having a resilient landing gear, and a time recording mechanism carried by the aeroplane, a lever pivoted to the recording mechanism and having a part adapted to engage a part of the recording mechanism to stop the same, a spring for normally holding the lever out of engagement with said part, said lever having an inclined face on its tail end, a flexible member connected to a part of the movable portion of the landing gear and having its upper end arranged adjacent the inclined face of the lever whereby when the said movable part of the gear is moved upwardly the flexible member is moved upwardly so that its upper end will engage the inclined face of the lever and move the lever into engagement with a part of the recording mechanism to stop the same, and a flexible casing enclosing the flexible member.

In testimony whereof I affix my signature.
KENNETH EARL GATH.